United States Patent [19]

Nauman

[11] 4,199,458
[45] Apr. 22, 1980

[54] MEMBRANE DIFFUSION DEVICE WITH EXTERNAL COMPRESSION

[75] Inventor: Mark R. Nauman, McHenry, Ill.

[73] Assignee: Baxter Travenol Laboratories, Inc., Deerfield, Ill.

[21] Appl. No.: 937,664

[22] Filed: Aug. 28, 1978

[51] Int. Cl.² ............................................ B01D 31/00
[52] U.S. Cl. .................................. 210/321 B; 422/48; 206/565
[58] Field of Search .......... 210/321 R, 321 A, 493 R, 210/493 M; 422/48; 220/72; 206/560, 561, 565; 264/249; 156/198, 220; 29/515, 521; 128/DIG. 3

[56] References Cited

U.S. PATENT DOCUMENTS

| | | | |
|---|---|---|---|
| 1,667,793 | 5/1928 | Mauser | 220/72 |
| 3,370,710 | 2/1968 | Bluemle, Jr. | 210/321 B |
| 3,513,982 | 5/1970 | Carter et al. | 210/493 R |
| 3,757,955 | 9/1973 | Leonard | 210/321 |
| 3,879,293 | 4/1975 | Wolf, Jr. et al. | 210/321 |
| 4,039,455 | 8/1977 | Bardin et al. | 210/321 A |
| 4,061,470 | 12/1977 | Leonard | 422/48 |
| 4,062,778 | 12/1977 | Riede | 210/321 B |

OTHER PUBLICATIONS

American Heritage Dictionary, W. Morris, Editor, Houghton-Mifflin Co., Boston, 1969, pp. 313 and 288.

*Primary Examiner*—Thomas G. Wyse
*Assistant Examiner*—David R. Sadowski
*Attorney, Agent, or Firm*—Henry W. Collins; Paul Flattery; George Gerstman

[57] ABSTRACT

A membrane diffusion device, such as a membrane oxygenator, is disclosed which comprises a stack of flat membrane wall pairs and flat membrane supports in alternating, interleaving relation. The casing includes a pair of opposed sidewalls that are substantially parallel to flat sides of the stack, and a pair of substantially vertical crimps are formed on each of the sidewalls to provide external compression on the end portions of the stack.

8 Claims, 4 Drawing Figures

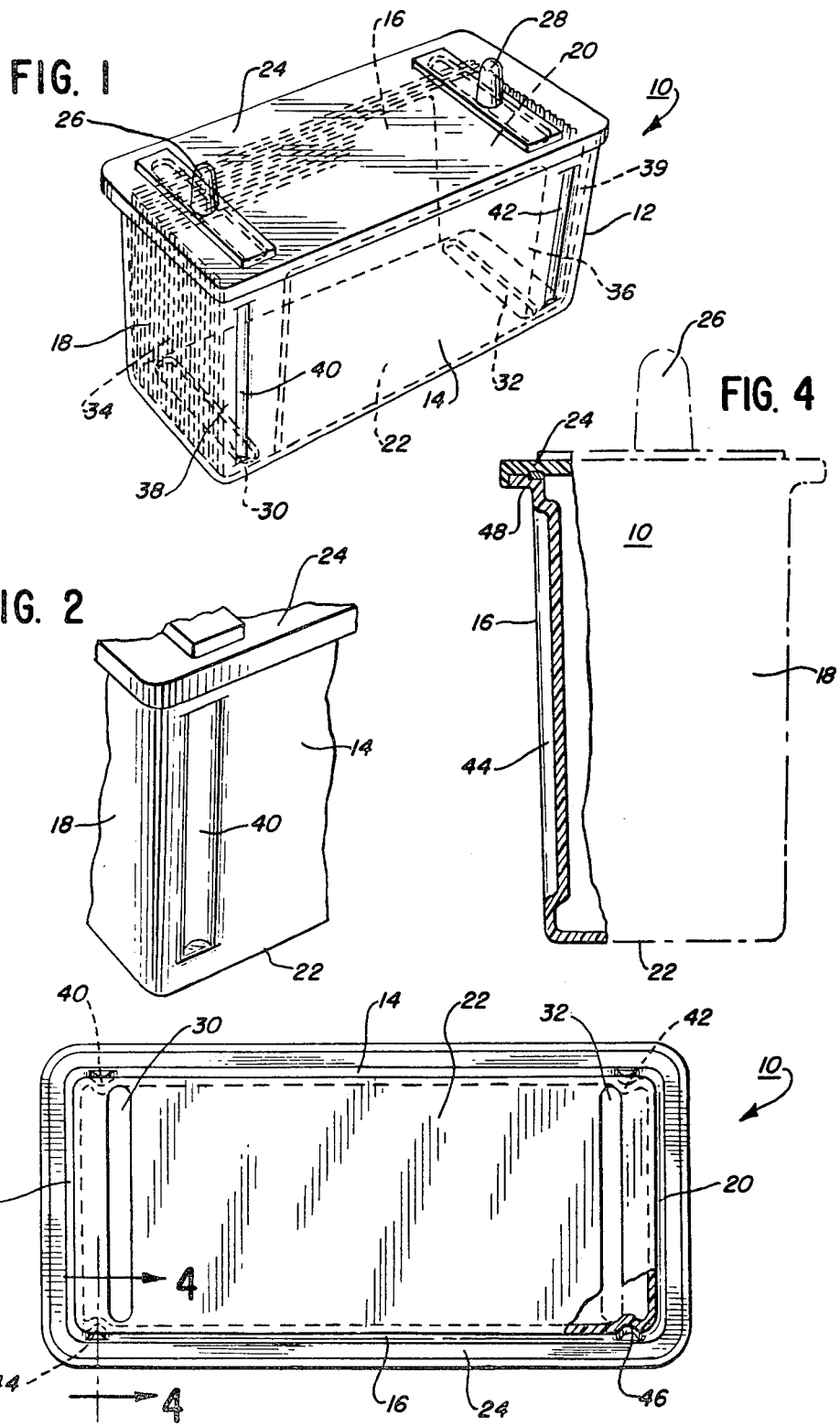

MEMBRANE DIFFUSION DEVICE WITH EXTERNAL COMPRESSION

BACKGROUND OF THE INVENTION

In U.S. Pat. No. 3,879,293, a membrane diffusion device is disclosed having an inflatable member for pressurization and sealing. The inflatable member is U-shaped, to be positioned about the major faces and the bottom side of a stack of membrane sections separated by membrane support member means, and defining interleaving flow paths for two different fluids, separated by the membranes.

The purpose of an inflatable member, whether a flat member as is well-known in the prior art, or the U-shaped member of the above patent, is to selectively apply pressure to the membrane stack by inflation while the stack is retained in a rigid casing, to prevent undue spreading of the fluid paths in the stack when pressurized fluid is provided. This is particularly important in the case where the device is intended for use as a blood oxygenator, an artificial kidney, or the like.

In certain membrane diffusion device constructions, particularly in blood oxygenators, a seal formed from room temperature vulcanizing silicone elastomer is provided between the sides of the membrane blood envelope. The present invention provides means for compressing the end portions of the stack, at the location of the room temperature vulcanizing seal, to prevent or correct leakage problems. By using an external compression system as described herein, the membrane diffusion device casing is strengthened, the end portions of the stack of membrane sections separated by membrane support member means are supported and mechanical support is added to augment the adhesive bonds of the stack.

The external compression means of the present invention is effective to aid in centering the stack in the casing and to constantly and uniformly compress the ends of the stack in a manner which eliminates any non-uniformity of compression of the stack, which may take place when the membrane stack is inserted in a casing having walls that are slightly non-parallel. This helps to reinforce the end seal of the membrane stack, placing a constant compression upon the seal element to prevent seal failure.

An important aspect of the present invention is that the external compression means described herein may be utilized to provide the desired compression to already existing membrane diffusion devices which lack the compressing means described herein.

Other objects and advantages of the present invention will be apparent as the description proceeds.

BRIEF DESCRIPTION OF THE INVENTION

In accordance with the present invention, a membrane diffusion device is provided which comprises a stack of flat membrane wall pairs and flat membrane supports in alternating, interleaving relation. The stack is disposed in a casing comprising a pair of opposed sidewalls that are substantially parallel to the flat sides of the stack, a pair of opposed end walls which are substantially perpendicular to the sidewalls, a bottom contiguous with the sidewalls and end walls and a lid closing the top of the casing.

The improvement comprises means for compressing the end portions of the flat sides of the stack. The compressing means comprises a pair of substantially vertical crimps formed on each sidewall. Each of the crimps is adjacent an end wall but is spaced a small distance therefrom. The crimps each comprise a portion of the respective sidewall that defines a substantially vertical groove extending inwardly toward the respective end portion of a flat side of the stack.

In the illustrative embodiment, the casing is formed of a plastic material and the crimps are formed subsequent to disposal of the stack in the casing. Each of the crimps extends from a point adjacent the top of the respective sidewall but spaced a small distance from the top to a point adjacent the bottom but spaced a small distance from the bottom.

In the illustrative embodiment, each of the crimps is formed subsequent to assembly of the stack, casing and lid by applying heat and pressure at the area of the sidewalls to be crimped. The heat comprises a focused, high intensity source of energy used to soften the area of the plastic material to be crimped.

A more detailed explanation of the invention is provided in the following description and claims, and is illustrated in the accompanying drawings.

BRIEF DESCRIPTION OF THE DRAWINGS

FIG. 1 is a perspective view of a membrane diffusion device constructed in accordance with the principles of the present invention;

FIG. 2 is a fragmentary, enlarged view of a corner of the membrane diffusion device of FIG. 1;

FIG. 3 is a bottom plan view of the membrane diffusion device of FIG. 1, with a portion broken for clarity; and FIG. 4 is an end view of the membrane support device of FIG. 1, with a portion thereof taken along the plane of the line 4—4 of FIG. 3.

DETAILED DESCRIPTION OF THE ILLUSTRATIVE EMBODIMENT

Referring to the drawings, FIGS. 1-4 show a membrane oxygenator 10 for blood which is similar to that shown in U.S. Pat. No. 3,879,293, but having the improvements as described herein.

Oxygenator 10 includes a casing 12 comprising opposed sidewalls 14 and 16, opposed end walls 18 and 20 which are substantially perpendicular to sidewalls 14 and 16, a bottom 22 which is contiguous with the sidewalls and end walls, and a lid 24 which closes the open top of the box-like structure formed by sidewalls 14, 16, end walls 18, 20 and bottom 22.

Lid 24 includes a sealed inlet port 26 and a sealed outlet port 28 for the blood flow. Slots 30 and 32 on the bottom 22 of casing 12 are for connection with an oxygen inlet and outlet conduit, respectively, with the flow of oxygen usually being in countercurrent relation to the flow of blood. Specifically, oxygenator 10 is adapted for use with apparatus described in U.S. Pat. No. 4,061,470 for the oxygenation of the blood of a patient undergoing heart surgery or the like.

A convoluted membrane stack 34 is provided as described in the previously cited patents and particularly U.S. Pat. No. 3,757,955, being adapted for flow communication in separate, multiple interleaving flow paths with blood inlet 26 and blood outlet 28 and oxygen inlet 30 and oxygen outlet 30. Positioned about the central portion of stack 34 is a U-shaped inflatable member 36, described in U.S. Pat. No. 3,879,293, for pressurizing the central portion of the stack 34. The end portions 38, 39 of the stack 34 are sealed with a compound such as room temperature vulcanizing silicone elastomer, to prevent leakage from the respective flow paths out of the ends of the membrane stack 34. Lid 24 is correspondingly sealed to the rest of the casing 12.

In accordance with this invention, external compressing means are provided for compressing the end portions of the flat sides of the membrane stack. The compressing means comprise a pair of substantially vertical crimps 40, 42 formed on sidewall 14 and corresponding substantially vertical crimps 44 and 46 (see FIG. 3) formed on sidewall 16. Crimps 40 and 44 are adjacent end wall 18 but are spaced a short distance therefrom, and crimps 42, 46 are adjacent end wall 20 but are spaced a small distance therefrom. Each of the crimps 40, 42, 44 and 46 comprises a portion of the respective sidewall that defines a substantially vertical groove extending inwardly toward the respective end portion of a flat side of the membrane stack.

As clearly shown in the Figures, each of the crimps 40, 42, 44 and 46 extends from a point adjacent the top 48 of the respective sidewall but is spaced a small distance therefrom to a point adjacent the bottom 22 but spaced a small distance therefrom. Casing 12 is preferably formed of a plastic material and the crimps 40, 42, 44 and 46 may be formed subsequent to assembly of the membrane stack 34, casing 12 and lid 24. In this manner, the casing is initially formed with substantially planar sidewalls and subsequent to assembly of the device, focused, high intensity sources of energy are used to soften the areas of the plastic material where crimps 40, 42, 44 and 46 are to be formed. When the plastic is in a softened state, a suitable tool is utilized to form the illustrated grooves. Once the grooves are formed, the source of energy is removed and the plastic will cool to retain the crimps 40, 42, 44 and 46.

In a specific example, although no limitation is intended, the vertical center line of each crimp is spaced approximately $\frac{3}{8}$ inch from its adjacent end, the crimp has a width of about $\frac{1}{4}$ inch and a depth of about $\frac{1}{4}$ inch and the top of the crimp is spaced about $\frac{1}{4}$ inch from top 48 of the sidewall and the bottom of the crimp is spaced about $\frac{1}{4}$ inch from bottom 22. In this manner, a desired compression on the end portions of the membrane stack has been provided, thereby aiding to prevent any leakage resulting from a breach in the room temperature vulcanizing seal between the sides of the membrane blood envelope.

Although an illustrative embodiment of the invention has been shown and described, it is to be understood that various modifications and substitutions may be made by those skilled in the art without departing from the novel spirit and scope of the present invention.

What is claimed is:

1. In a membrane diffusion device which comprises a stack of flat membrane wall pairs and flat membrane supports in alternating, interleaving relation, said stack being disposed in a casing comprising a pair of opposed sidewalls that are substantially parallel to the flat sides of said stack, and a pair of opposed end walls which are substantially perpendicular to said sidewalls, a bottom contiguous with said sidewalls and end walls and a lid closing the top of the casing, the improvement comprising: means for compressing the end portions of the flat sides of said stack, said compression means comprising a pair of of substantially vertical crimping grooves formed on each sidewall with each of said crimping grooves being adjacent an end wall but spaced a small distance therefrom, said crimping grooves each comprising a portion of the respective sidewall extending inwardly toward the respective end portion of a flat side of said stack.

2. In a membrane diffusion device as described in claim 1, said casing being formed of a plastic material and said crimping grooves being formed subsequent to disposal of said stack in said casing.

3. In a membrane diffusion device as described in claim 1, each of said crimping grooves extending from a point adjacent the top of the respective sidewall but spaced a small distance from the top to a point adjacent said bottom but spaced a small distance from said bottom.

4. In a membrane diffusion device as described in claim 1, each of said crimping grooves being formed subsequent to assembly of the stack, casing and lid by applying heat and pressure at the area of the sidewalls to be crimped.

5. In a membrane diffusion device as described in claim 4, wherein said casing is formed of a plastic material and said heat comprises a focused, high intensity source of energy used to soften the area of said plastic material to be crimped.

6. A membrane diffusion device as described in claim 1, each of said crimping grooves having a width of about $\frac{1}{4}$ inch and a depth of about $\frac{1}{4}$ inch.

7. In a membrane diffusion device which comprises a stack of flat membrane wall pairs and flat membrane supports in alternating, interleaving relation, said stack being disposed in a casing comprising a pair of opposed sidewalls that are substantially parallel to the flat sides of said stack, a pair of opposed end walls which are substantially perpendicular to said sidewalls, a bottom contiguous with said sidewalls and end walls and a lid closing the top of the casing, the improvement comprising: means for compressing the end portions of the flat sides of said stack, said compressing means comprising a pair of substantially vertical crimping grooves formed on each sidewall with each of said crimping grooves being adjacent an end wall spaced a small distance therefrom, each of said crimping grooves extending from a point adjacent the top of the respective sidewall but spaced a small distance from the top to a point adjacent said bottom but spaced a small distance from said bottom; said crimping grooves each comprising a portion of the respective sidewall extending inwardly toward the respective end portion of a flat side of said stack; said casing being formed of a plastic material and each of said crimping grooves being formed subsequent to assembly of the stack, casing and lid by applying heat and pressure at the area of the sidewalls to be crimped, said heat comprising a focused, high intensity source of energy used to soften the area of the plastic material to be crimped.

8. In a membrane diffusion device as described in claim 7, each of said crimps having a width of about $\frac{1}{4}$ inch and a depth of about $\frac{1}{4}$ inch.

* * * * *